United States Patent
East et al.

(10) Patent No.: US 6,651,077 B1
(45) Date of Patent: Nov. 18, 2003

(54) BACKUP AND RESTORATION OF DATA IN AN ELECTRONIC DATABASE

(75) Inventors: Jeffrey A. East, Sammamish, WA (US); Steven R. Schmidt, Redmond, WA (US); Gregory A. Smith, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 336 days.

(21) Appl. No.: 09/671,496

(22) Filed: Sep. 27, 2000

(51) Int. Cl.[7] ............................................... G06F 17/30
(52) U.S. Cl. ........................................ 707/204; 707/202
(58) Field of Search ................................. 707/202, 203, 707/204, 200

(56) References Cited

U.S. PATENT DOCUMENTS 5,574,903 A * 11/1996 Szymanski et al. ............ 707/1
5,745,674 A * 4/1998 Lupton et al. ................. 714/20
5,991,771 A * 11/1999 Falls et al. .................... 707/202
6,453,325 B1 * 9/2002 Cabrera et al. ............... 707/204

* cited by examiner

Primary Examiner—Safet Metjahic
Assistant Examiner—Cam-Linh Nguyen
(74) Attorney, Agent, or Firm—Woodcock Washburn LLP

(57) ABSTRACT

To avoid possible data corruption resulting from restoring data to a database from a backup set that is not valid for the database, attempted restore operations are intercepted before they are performed. The backup set is examined to determine whether it was created from the same recovery fork on which the database resides or an descendant of that recovery fork. The backup set is only allowed to be applied to the database if the backup set was created from one of these recovery forks. If not, the backup set is not allowed to be applied to the database.

20 Claims, 9 Drawing Sheets

ACTION TIME LINE

BACKUP AND RESTORATION OF DATA IN AN ELECTRONIC DATABASE

FIELD OF THE INVENTION

The invention relates generally to electronic databases. More particularly, the invention relates to backup and restoration of data in such databases.

BACKGROUND

Database systems often perform backup and restore operations to provide a safeguard for protecting critical data stored in databases. Backing up and restoring a database allows for the complete restoration of data over a wide range of potential system problems, including media failure, user errors, or loss of database servers. In addition, backing up and restoring databases is useful for other types of problems not related to the system itself, such as moving or copying a database from one server to another. By backing up a database from one computer and restoring it to another, a copy of a database can be made quickly and easily.

Backup operations can be performed, for example, as database backups or transaction log backups. Other types of backup operations include file backups, differential file backups, and differential backups. Backing up a database makes a copy of the database that can be used to restore the database if it is lost. Everything in the database is copied, including any needed portions of the transaction log. The transaction log is a serial record of all the modifications that have occurred in a database and includes information as to which transaction performed each modification. The transaction log is used during restore operations to roll forward completed transactions and to roll back or undo uncompleted transactions.

By contrast to a database backup, backing up a transaction log backs up only the changes that have occurred in the transaction log after a prescribed synchronization point. For database backup operations, this synchronization point might occur after data is copied from the database files, but before copying the portion of the transaction log that is needed to provide a transactionally consistent view of the data that was copied from the database files. For log backup operations, the synchronization point might occur before the log is copied to the backup media, i.e., roughly the start of the log backup operation. Thus, while a database backup records the complete state of the data in the database at the time the backup operation is completed, a transaction log backup records only the state of the transaction log at this synchronization point.

Other backup operations include differential database backups, which only copy those database pages that have been modified after the last full database backup, as well as the portion of the transaction log that is needed to roll it forward and perform undo operations for transaction consistency. Like transaction log backups, differential database backups improve recoverability by reducing the amount of data at risk for loss in the event of failure. Moreover, the amount of time involved in performing a restore operation is reduced relative to full database backups. Unlike transaction log backups, however, differential database backups do not necessarily allow restoration to the exact point of failure. Restoration can only be performed up to the point in time at which the differential database backup was created. Thus, differential database backups are often supplemented by subsequent transaction log backups. Still another type of backup operation is a file or filegroup backup, which allows the recovery of just the portion of a database that was on a disk that failed.

A restore operation involves the application of a backup set to a database. Restoring a database backup returns the database to the state in which it was when the backup was created. Any incomplete transactions in the database backup are rolled back to ensure that the database remains internally consistent. Incomplete transactions include any transactions that were not complete as of the above-described synchronization point. Restoring a transaction log backup reapplies all completed transactions that are in the transaction log to the database. When applying a transaction log backup, the transaction log is traversed, and all transactions in the log are rolled forward. When the end of the transaction log is reached, the database is restored to the state in which it was when the transaction log backup operation began. The restore operation then rolls back all transactions that were incomplete when the backup operation started.

Database backups and transaction log backups are advantageously used together to restore a database to the point in time at which a failure occurred. Loss of data due to the failure can be greatly reduced or even eliminated entirely. In certain situations, using both database and transaction log backups is highly desirable. For example, the practice is advisable in any situation in which any loss of changes after the last database backup is unacceptable. The use of transaction log backups is also indicated when the resources involved in performing only database backups are limited. In addition, transaction log backups are advantageous in cases in which it is desirable to return the database to some point in time before failure.

In addition, it is also advisable to use transaction log backups in cases in which changes to the database are frequent. When a large number of changes occur to the database over a relatively short period of time, the last database backup can become outdated quickly. Because transaction log backups typically use fewer resources than database backups, they can be created more frequently than database backups. Thus, the window of time in which a failure can occur after a backup is reduced, also reducing the amount of data that is potentially lost. Further, by applying transaction log backups, the database can be recovered to a specific point in time before a failure. This point in time need not be immediately before the failure.

To restore a database from both a database backup and one or more transaction log backups, the most recent database backup is typically restored. Next, the transaction log backups that were created after the most recent database backup are applied in the same order in which they were created. Although the use of transaction log backups increases recoverability, creating and applying them is also more complex than using database backups alone. Restoring a database using both database and transaction log backups works only if there is an unbroken sequence of transaction log backups after the last database or differential database backup.

One difficulty encountered in the context of backup and restore operations is the possibility of database corruption in certain situations. Each time a new database is created by recovering the database through certain restore operations, a divergent path known as a recovery fork is created. For example, in the case of a database restore operation followed by one or more log restore operations, all operations except the last one are performed without the option of recovery and thus do not result in the creation of a new database. The last log restore operation, however, is performed with the option of recovery and effectively results in the creation of a new database, and thus of a new recovery fork. Performing a restore operation with the option of recovery essentially results in the creation of a new database and, thus, a new recovery fork. If a backup set is applied to a database from a different recovery fork than the fork on which the backup set resides, corruption may result.

FIG. 2 depicts an example backup and restore process in which multiple recovery forks are generated, and in which the database would be corrupted. In FIG. 2, the letters "A" and "B" represent the recovery fork on which the database resides at the beginning of the process illustrated and described at that particular point in time. First, at a time 202, a full database backup is made. For reference purposes, this backup is labeled "1." At this point, there is only one recovery fork, referred to as fork "A." Subsequently, transaction log backups labeled "2" and "3" are made at times 204 and 206, respectively.

After the transaction log backups are created, a restore operation is performed by applying the full database backup "1" at a time 208. This restore operation is performed without the option of recovery. Next, at a time 210, the transaction log backup "2" is applied to the database with the option of recovery. As discussed above, because this restore operation is performed with the recovery option, a new divergent fork "B" is generated when the transaction log backup is applied. Recovery fork "B" includes the transaction log backups labeled "4" and "5" on FIG. 2, which are created at times 212 and 214, respectively.

Subsequently, restore operations are performed at times 216, 218, and 220. At time 216, the full database backup "1" is applied to the database to restore the database to its state at time 202, when the full database backup "1" was created. The transaction log backups "2" and "3" are then applied, bringing the database to its state at time 206, when the transaction log backup "3" was created. Because the transaction log backup "3" is associated with the recovery fork "A," the database is said to be in the recovery fork "A." All of these restore operations are performed without the option for recovery, and no additional recovery forks are created.

Next, at a time 222, the system attempts to apply the transaction log backup "4" to the database. Because the transaction log backup "4" is associated with the recovery fork "B," it is essentially from a different database than the current database, which is in the recovery fork "A." As a result, applying the transaction log backup "4" would result in database corruption. Specifically, the system might find that the database is not rolled forward or back far enough to apply the log. Alternatively, an operation might be erroneously asserted during the rollforward or rollback process. Another possibility is that the data itself would become invalid.

Unfortunately, some conventional database systems cannot reliably detect this condition, and data can be corrupted as a result. Moreover, this potential for data corruption is not limited to transaction log restore operations. Differential restore operations and file restore operations also raise this possibility. Accordingly, a need continues to exist for a backup and restoration process that avoids the application of backup sets to databases for which they are invalid, thus eliminating the likelihood of database corruption.

SUMMARY OF THE INVENTION

Various implementations of the present invention prevent certain restore attempts that would corrupt a database. In particular, the systems and methods of the present invention reject attempted restore operations involving a backup set that was generated from a different recovery fork than the fork on which the database currently resides. To prevent such backup sets from being applied, a partial history of the database's recovery path is maintained in both the database and backup sets. When a restore operation is attempted, it is permitted only if the backup set involved is on the database's current fork or one of its descendants.

One particular implementation of the present invention is directed to a computer-implemented method for restoring information to an electronic database from a sequence of at least one backup set. A history of one or more backup operations performed on the electronic database, which is associated with a recovery fork, is maintained. When a restore operation using the backup set is attempted, it is intercepted. It is then determined whether the backup set is associated with the recovery fork or an descendant of the recovery fork. The attempted restore operation is permitted only if the backup set is associated with the recovery fork or an descendant of the recovery fork.

In another implementation, this history is maintained both in the electronic database and in the backup set. Each history is stored as a push-down stack of two recovery fork names each having a globally unique identifier (GUID) and a log sequence number (LSN). For purposes of this disclosure, a log sequence number is a value that is generated when a page is changed and is used to synchronize the page state with its corresponding log entries. Log sequence numbers are unique and monotonically increase within a given GUID, but not necessarily between different GUIDs. An attempted restore operation that uses the backup set is intercepted. The system determines whether a recovery fork name associated with the backup set has a GUID that matches a GUID of a recovery fork name associated with the electronic database. If the GUID of the first entry of the backup set's recovery fork name stack matches the GUID of the recovery fork name associated with the electronic database, the backup set is compatible with the database. If a match is found in a different entry of the backup set's recovery fork name stack, the LSNs of the matching recovery fork names are compared. The attempted restore operation is rejected if the LSN of the recovery fork name associated with the database is greater than the LSN of the recovery fork name associated with the backup set. The attempted restore operation is permitted if a recovery fork name associated with the backup set has a GUID that matches a GUID of a recovery fork name associated with the electronic database and the LSN of the recovery fork name associated with the database is no greater than the LSN of the recovery fork name associated with the backup set.

Yet another implementation of the present invention is directed to a computer-implemented method for creating a backup set based on information from an electronic database. A history of one or more backup operations performed on the electronic database is maintained. This history is copied to the backup set. If the backup set is to be the result of a database backup operation, the history is then updated to reflect a binding identifier of the backup set. If the backup set is to be the result of a backup operation other than a file backup operation, the history is updated. The backup operation is then performed.

Another implementation involves a computer-readable medium storing a data structure that has a data field containing data identifying a recovery fork with which an electronic database is associated. Another data field contains data representing a sequence number within the recovery fork with which the electronic database is associated. Still another implementation is directed to a computer-readable medium storing a data structure that includes a stack of recovery fork identifiers. Each fork identifier contains the two above-described data fields.

Still other implementations include computer-readable media and apparatuses for performing the above-described methods. The above summary of the present invention is not intended to describe every implementation of the present invention. The figures and the detailed description that follow more particularly exemplify these implementations.

DETAILED DESCRIPTION

In the following detailed description of various embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

Hardware and Operating Environment

Figure 1:
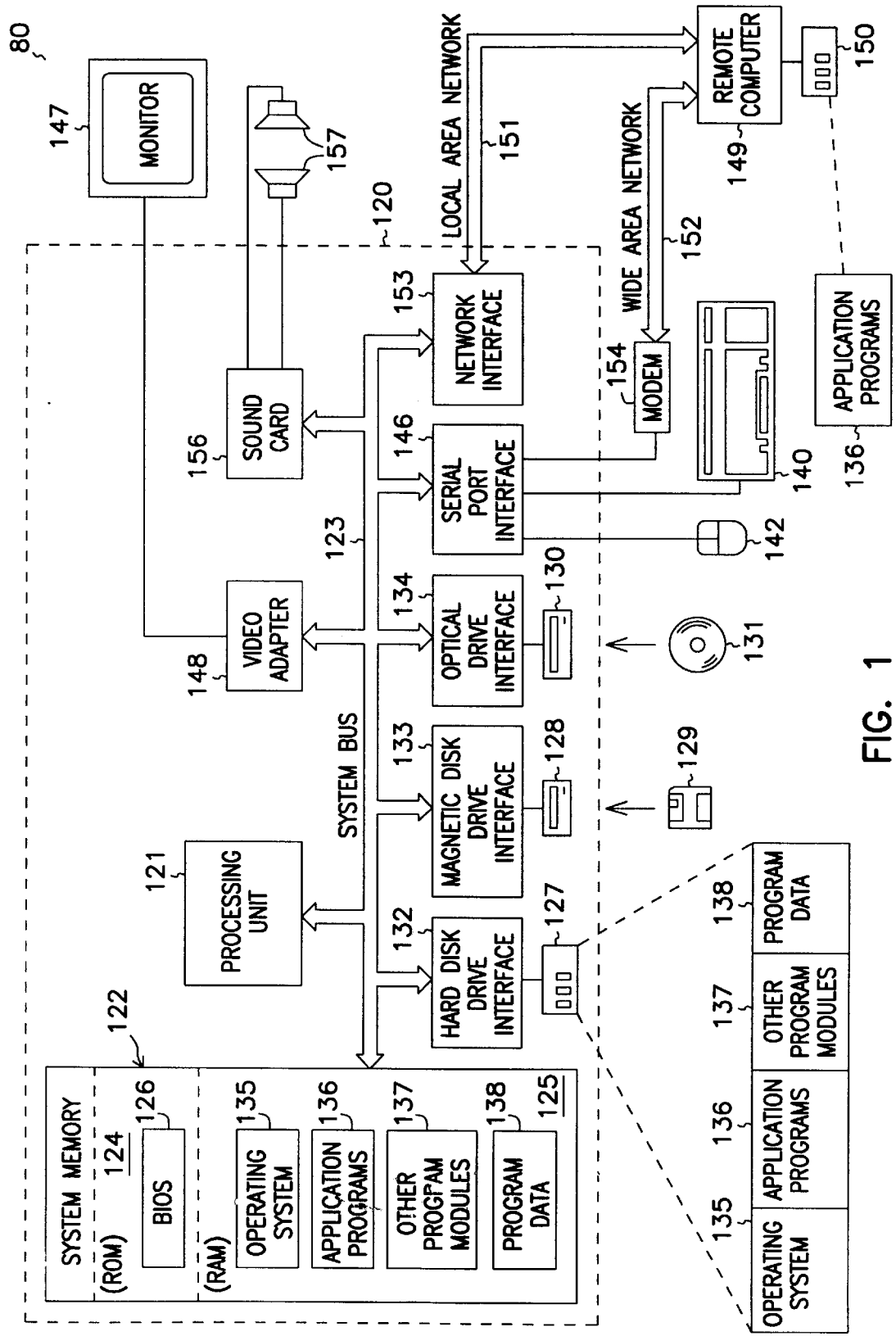
FIG. 1 illustrates a simplified overview of an example embodiment of a computing environment for the present invention.
Figure 2:
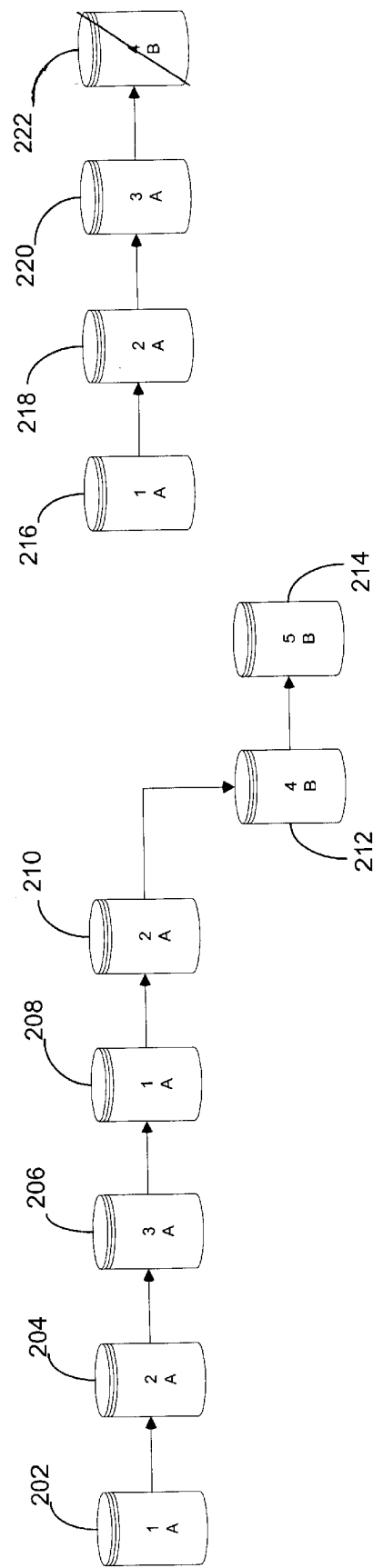
FIG. 2 depicts an operational example of backup and restore operations in a conventional database system that potentially results in database corruption.

FIG. 1 illustrates a hardware and operating environment in conjunction with which embodiments of the invention may be practiced. The description of FIG. 1 is intended to provide a brief, general description of suitable computer hardware and a suitable computing environment with which the invention may be implemented. Although not required, the invention is described in the general context of computer-executable instructions, such as program modules, being executed by a computer, such as a personal computer (PC). This is one embodiment of many different computer configurations, some including specialized hardware circuits to analyze performance, that may be used to implement the present invention. Generally, program modules include routines, programs, objects, components, data structures, etc. that perform particular tasks or implement particular abstract data types.

Moreover, those skilled in the art will appreciate that the invention may be practiced with other computer-system configurations, including hand-held devices, multiprocessor systems, microprocessor-based or programmable consumer electronics, network personal computers ("PCs"), minicomputers, mainframe computers, and the like. The invention may also be practiced in distributed computing environments where tasks are performed by remote processing devices linked through a communications network. In a distributed computing environment, program modules may be located in both local and remote memory storage devices.

FIG. 1 shows a computer arrangement implemented as a general-purpose computing or information-handling system 80. This embodiment includes a general purpose computing device such as personal computer (PC) 120, that includes processing unit 121, a system memory 122, and a system bus 123 that operatively couples the system memory 122 and other system components to processing unit 121. There may be only one or there may be more than one processing unit 121, such that the processor computer 120 comprises a single central-processing unit (CPU), or a plurality of processing units, commonly referred to as a parallel processing environment. The computer 120 may be a conventional computer, a distributed computer, or any other type of computer; the invention is not so limited.

In other embodiments other configurations are used in the personal computer 120. System bus 123 may be any of several types, including a memory bus or memory controller, a peripheral bus, and a local bus, and may use any of a variety of bus architectures. The system memory 122 may also be referred to as simply the memory, and it includes read-only memory (ROM) 124 and random-access memory (RAM) 125. A basic input/output system (BIOS) 126, stored in ROM 124, contains the basic routines that transfer information between components of personal computer 120. BIOS 126 also contains start-up routines for the system.

The personal computer 120 typically includes at least some form of computer-readable media. Computer-readable media can be any available media that can be accessed by the personal computer 120. By way of example, and not limitation, computer readable media may comprise computer storage media and communication media. Computer storage media includes volatile and nonvolatile, removable and non-removable media implemented in any method or technology for storage information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the personal computer 120. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included in the scope of computer readable media.

By way of example, the particular system depicted in FIG. 1 further includes a hard disk drive 127 having one or more magnetic hard disks (not shown) onto which data is stored and retrieved for reading from and writing to hard-disk-drive interface 132, magnetic disk drive 128 for reading from and writing to a removable magnetic disk 129, and optical disk drive 130 for reading from and/or writing to a removable optical disk 131 such as a CD-ROM, DVD or other optical medium. The hard disk drive 127, magnetic disk drive 128, and optical disk drive 130 are connected to system bus 123 by a hard-disk drive interface 132, a magnetic-disk drive interface 133, and an optical-drive interface 134, respectively. The drives 127, 128, and 130 and their associated computer-readable media 129, 131 provide nonvolatile storage of computer-readable instructions, data structures, program modules and other data for personal computer 120.

In various embodiments, program modules are stored on the hard disk drive 127, magnetic disk 129, optical disk 131, ROM 124 and/or RAM 125 and may be moved among these devices, e.g., from hard disk drive 127 to RAM 125. Program modules include operating system 135, one or more application programs 136, other program modules 137, and/or program data 138. A user may enter commands and information into personal computer 120 through input devices such as a keyboard 140 and a pointing device 42. Other input devices (not shown) for various embodiments include one or more devices selected from a microphone, joystick, game pad, satellite dish, scanner, or the like. These and other input devices are often connected to the processing unit 121 through a serial-port interface 146 coupled to system bus 123, but in other embodiments they are connected through other interfaces not shown in FIG. 1, such as a parallel port, a game port, or a universal serial bus (USB) interface. A monitor 147 or other display device also connects to system bus 123 via an interface such as a video adapter 148. In some embodiments, one or more speakers 157 or other audio output transducers are driven by sound adapter 156 connected to system bus 123. In some embodiments, in addition to the monitor 147, system 80 includes other peripheral output devices (not shown) such as a printer or the like.

In some embodiments, the personal computer 120 operates in a networked environment using logical connections to one or more remote computers such as remote computer 149. Remote computer 149 may be another personal computer, a server, a router, a network PC, a peer device, or other common network node. Remote computer 149 typically includes many or all of the components described above in connection with personal computer 120; however, only a storage device 150 is illustrated in FIG. 1. The logical connections depicted in FIG. 1 include local-area network (LAN) 151 and a wide-area network (WAN) 152, both of which are shown connecting the personal computer 120 to remote computer 149; typical embodiments would only include one or the other. Such networking environments are commonplace in offices, enterprise-wide computer networks, Intranets and the Internet.

When placed in a LAN networking environment, the personal computer 120 connects to local network 151 through a network interface or adapter 153. When used in a WAN networking environment such as the Internet, the personal computer 120 typically includes modem 154 or other means for establishing communications over network 152. Modem 154 may be internal or external to the personal computer 120 and connects to system bus 123 via serial-port interface 146 in the embodiment shown. In a networked environment, program modules depicted as residing within the personal computer 120 or portions thereof may be stored in remote-storage device 150. Of course, the network connections shown are illustrative, and other means of establishing a communications link between the computers may be substituted.

Software may be designed using many different methods, including object-oriented programming methods. C++ and Java are two examples of common object-oriented computer programming languages that provide functionality associated with object-oriented programming. Object-oriented programming methods provide a means to encapsulate data members (variables) and member functions (methods) that operate on that data into a single entity called a class. Object-oriented programming methods also provide a means to create new classes based on existing classes.

An object is an instance of a class. The data members of an object are attributes that are stored inside the computer memory, and the methods are executable computer code that act upon this data, along with potentially providing other services. The notion of an object is exploited in the present invention in that certain aspects of the invention are implemented as objects in some embodiments.

An interface is a group of related functions that are organized into a named unit. Some identifier may uniquely identify each interface. Interfaces have no instantiation; that is, an interface is a definition only without the executable code needed to implement the methods that are specified by the interface. An object may support an interface by providing executable code for the methods specified by the interface. The executable code supplied by the object must comply with the definitions specified by the interface. The object may also provide additional methods. Those skilled in the art will recognize that interfaces are not limited to use in or by an object-oriented programming environment.

Example Embodiments

In a particular embodiment of the present invention, the likelihood of database corruption during restore operations is reduced by maintaining a partial history of the database's recovery path in both the database and backup sets. This partial history includes a push-down stack consisting of two or more recovery fork names.

Each recovery fork name is a two-tuple consisting of a globally unique identifier (GUID) and a log sequence number (LSN). The GUID identifies the recovery fork and is uniquely generated whenever a new fork is created by creating a database or by restoring with the option of recovery. The LSN is a sequence number that is unique within each recovery fork, though not necessarily between recovery forks. Within a recovery fork, the LSNs of successive entries increase monotonically.

When a restore operation is attempted, the recovery fork names in the stack of the backup set sought to be applied is compared with the recovery fork name associated with the database. The restore operation is permitted only if the recovery fork names are compatible. If the recovery fork names are not compatible, the restore operation is rejected. Thus, attempted restore operations are validated before they are allowed to be completed. Besides transaction log backups, differential backup and restore operations can also be performed according to this approach to reduce the likelihood of data corruption.

File backup and restore operations can be performed using a similar technique. Different files can be on different recovery forks at different points during the restore process, though all such recovery forks must share a common path. Thus, unlike in the case of database, transaction log, and differential backups, recovery fork histories alone cannot be used to validate file restore operations deterministically, unless the backup and database sets both have a historically complete set of recovery fork names. Instead, files are denoted as either "eligible" or "ineligible" for log recovery. Media recovery operations ignore log records that require the application of ineligible files. In the case of an attempted log restore operation with the option of recovery, the entire operation attempt is rejected unless all database files reside on the same recovery fork.

In this particular embodiment, specialized data structures are used to store the recovery fork names. The recovery fork name is a two-tuple consisting of a GUID and a log sequence number (LSN). A unique GUID is generated when a new fork is created by creating a database or performing a restore operation with the option of recovery. The LSN is the database's current backup LSN, i.e., the LSN corresponding to the most recent backup operation.

Further, the database includes a database-wide fork stack (DBINFO), which includes data structures for storing two or more recovery fork names. These recovery fork names form a push-down stack. When a name is pushed on a full stack, the bottom-most name is discarded. In one embodiment, the push-down stack contains two elements. The stack, however, may contain more elements, with an n-element stack enabling validation of file restore attempts that occurred on the most recent n recovery forks associated with the database. As another alternative, the stack may not be limited in the number of elements it contains. This implementation provides a complete history of recovery forks, such that all file restore operations can be immediately validated as being (or not being) on a given recovery fork.

To further facilitate maintaining a record of the partial history of the recovery path, each database file header contains a current fork identifier that identifies the current fork on which the database file resides. This property is of a recovery fork name type.

The backup sets also store a partial history of the recovery path. Specifically, each backup set has a two-element stack that stores two or more recovery fork names. The stack is implemented using, for example, the following declarations:

```
class SQL_RECOVERY_FORK_NAME {
    SQL_LSN     m_lsn;
    MTF_UUID    m_guid;
};
class SQL_CONFIG_INFO : public SQL_HEADER {
    .
    .
    .
    SQL_RECOVERY_FORK_NAME  m_recovery_fork_names
                                           [2];
};
```

Figure 3:
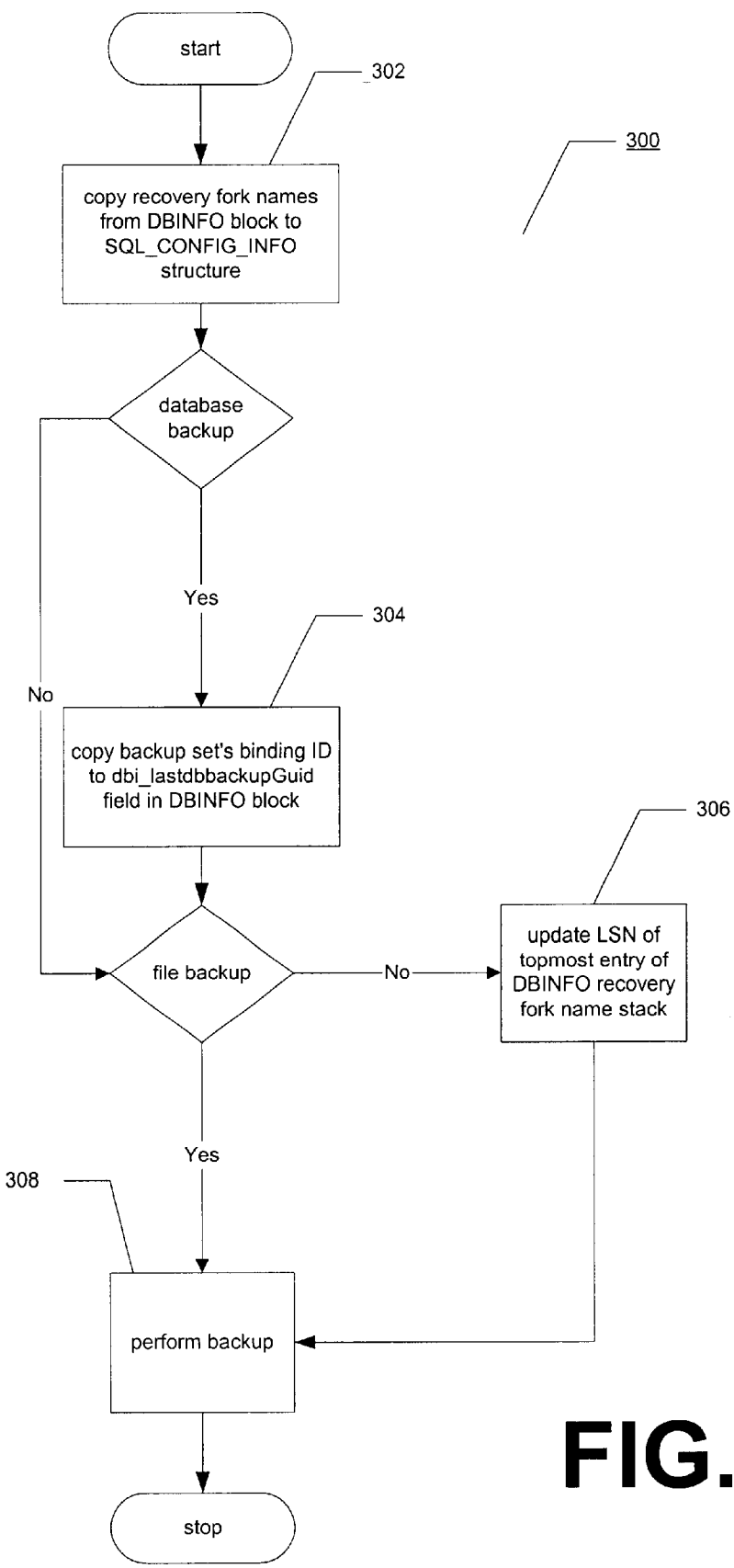
FIG. 3 is a flowchart illustrating an example method for performing a backup operation, according to an embodiment of the present invention.

FIG. 3 is a flowchart illustrating an example method 300 for performing a backup operation, according to a particular embodiment of the present invention. First, the backup operation is performed, as depicted at a block 302. When any type of backup operation that involves writing a backup set is performed, the recovery fork history is maintained by saving the recovery fork names as part of the database configuration information in the backup sets. This process is depicted at a block 304 and is performed using a write function within the $SQL_{13}$ CONFIG_INFO structure. All types of backup operations except for file backups cause the LSN of the topmost entry in the database-wide fork stack DBINFO to be updated. In a particular implementation, the recovery fork name's LSN is set to the current end-of-log LSN, as depicted at a block 306. For different types of backups, the end-of-log LSN may be chosen using different methods.

Restore Operations

The manner in which a restore operation is performed depends on whether or not a file restore operation is involved. In general, a restore operation involves one or more processes that ensure that (1) the backup set is eligible to be applied to the database, and (2) the system has the correct information to make the determination as to whether a backup set is eligible to be applied to the database. To this end, when a restore operation is attempted under certain conditions, the system verifies that the backup set resides on a recovery fork that is compatible with the recovery fork on which the database resides. If the backup set is compatible with the database, it is marked as eligible to be applied to the database. If not, depending on the circumstances, either the database file is marked as ineligible to be rolled forward, or the entire restore attempt is rejected.

The particular processes involved in a given restore operation depend on whether or not a file restore operation is involved. For example, as discussed in greater detail below, a log restore operation is processed in one way if it follows a database or a differential restore operation, but in a different way if it follows a file restore operation. An understanding of the operation of various embodiments of the present invention may be gained by those of ordinary skill in the art upon review of the following operational examples.

Database Restore Operations

Figure 4:
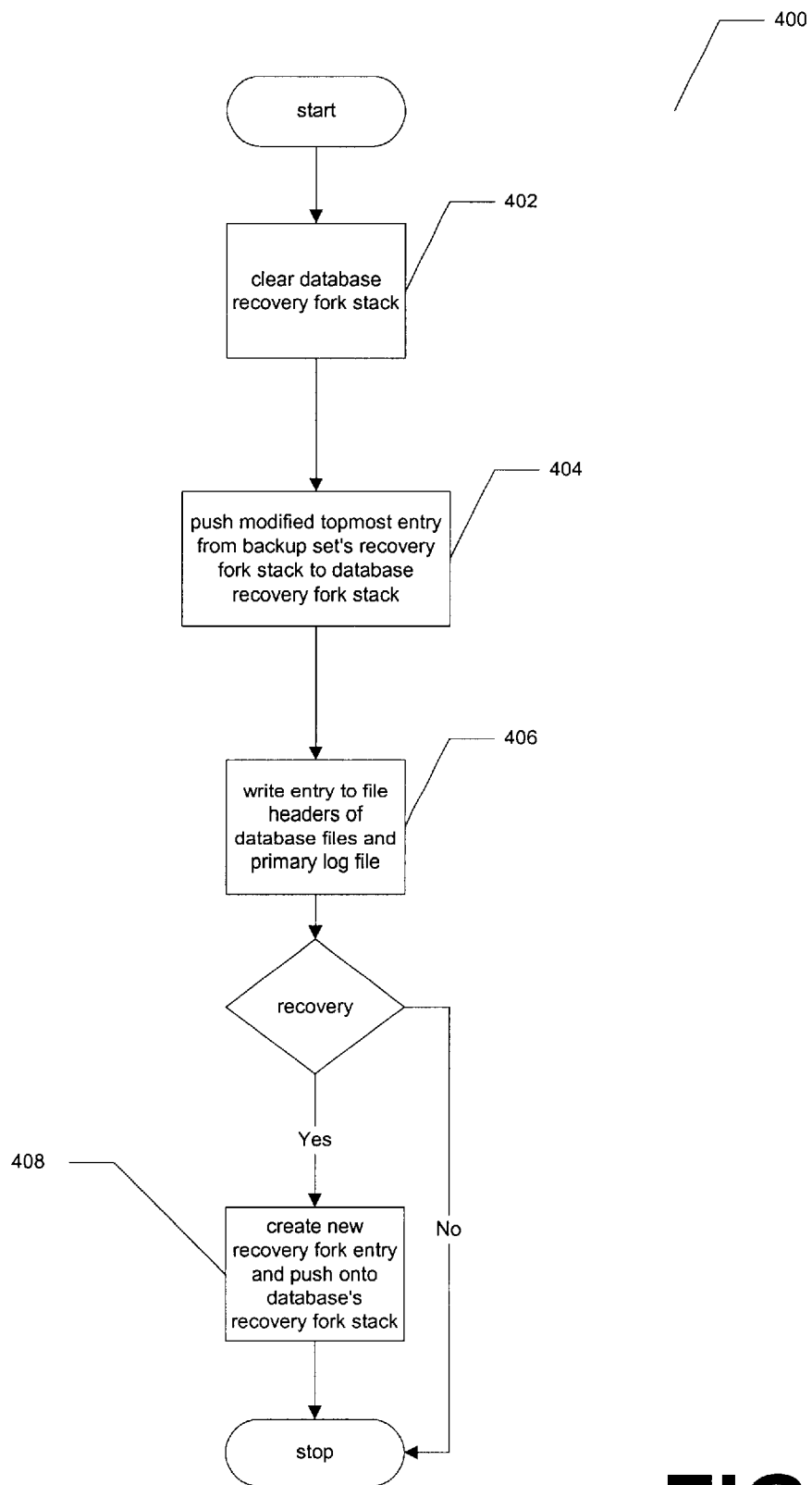
FIG. 4 is a flowchart illustrating an example method for performing a restore operation, according to an operational example of an embodiment of the present invention.

FIG. 4 is a flowchart depicting an example process 400 for performing a database restore operation, according to one embodiment of the present invention. Because the entire database is being restored, there is no danger of the backup set being incompatible with the database. Accordingly, all attempted database restore operations are permitted without the need to perform recovery fork validation.

After the database restore operation is performed, recovery fork maintenance is performed as follows. First, at a block 402, the database recovery fork stack is cleared. The topmost entry from the backup set's recovery fork stack is then pushed onto the database recovery fork stack with its LSN replaced with the most recent LSN from the backup set, as depicted at a block 404. This entry is also written to the file header of each database file as well as the primary log file, as shown at a block 406. Further, as illustrated at a block 408, if the restore operation is performed with the option of recovery, a new recovery fork entry is created and is pushed onto the database's recovery fork stack, because performing a database restore operation with the option of recovery essentially creates a new database. The database's recovery fork stack thus contains two entries. The new recovery fork entry has a new GUID and the most recent LSN from the backup set.

Differential Database Restore Operations

Figure 5:
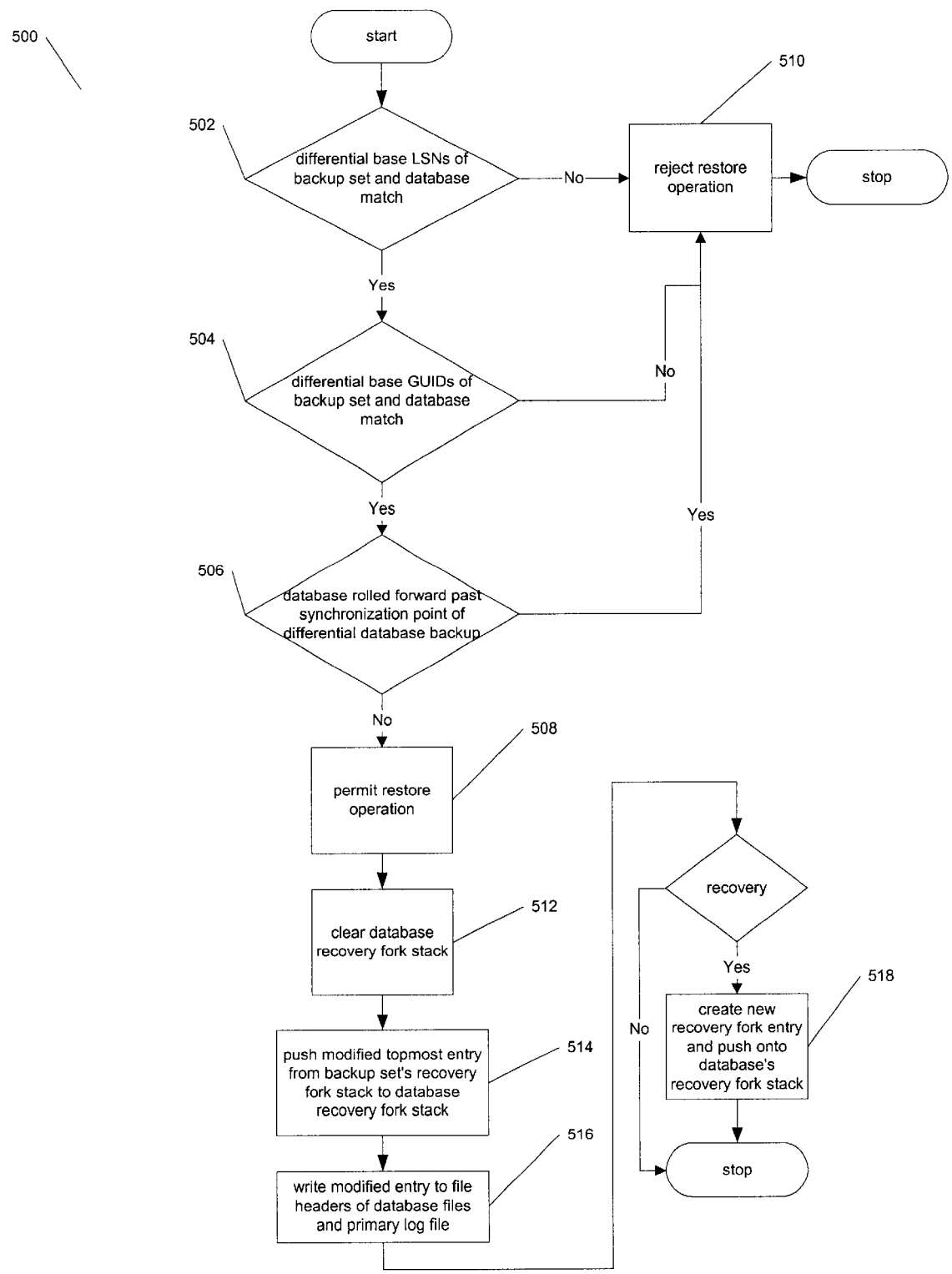
FIG. 5 is a flowchart illustrating another example method for performing a restore operation, according to another operational example of an embodiment of the present invention.

Differential database restore operations are handled the same way regardless of whether they are to be performed with or without the option of recovery, except with respect to recovery fork maintenance. FIG. 5 depicts an example method 500 for performing a differential database restore operation. At a decision block 502, it is determined whether the backup set's differential base LSN matches that of the database. If so, flow proceeds to a decision block 504, at which the system determines whether the backup set's differential base GUID matches that of the database, if present. If so, the system then verifies, at a decision block 506, that the database has not been rolled forward past the synchronization point of the differential database backup. The differential database restore operation is only permitted, at a block 508, if all three of these tests are passed. If any of these tests is failed, the attempted operation is rejected at a block 510.

If the operation is permitted, recovery fork maintenance is performed after the operation is completed. First, at a block 512, the database recovery fork stack is cleared. The topmost entry from the backup set's recovery fork stack is then pushed onto the database recovery fork stack with its LSN replaced with the most recent LSN from the backup set, as depicted at a block 514. This entry is also written to the file header of each database file as well as the primary log file, as shown at a block 516. Further, as illustrated at a block 518, if the restore operation is performed with the option of recovery, a new recovery fork entry is created and is pushed onto the database's recovery fork stack, because performing a database restore operation with the option of recovery essentially creates a new database. The database's recovery fork stack thus contains two entries. The new recovery fork entry has a new GUID and the most recent LSN from the backup set.

File Restore Operations

Figure 6:
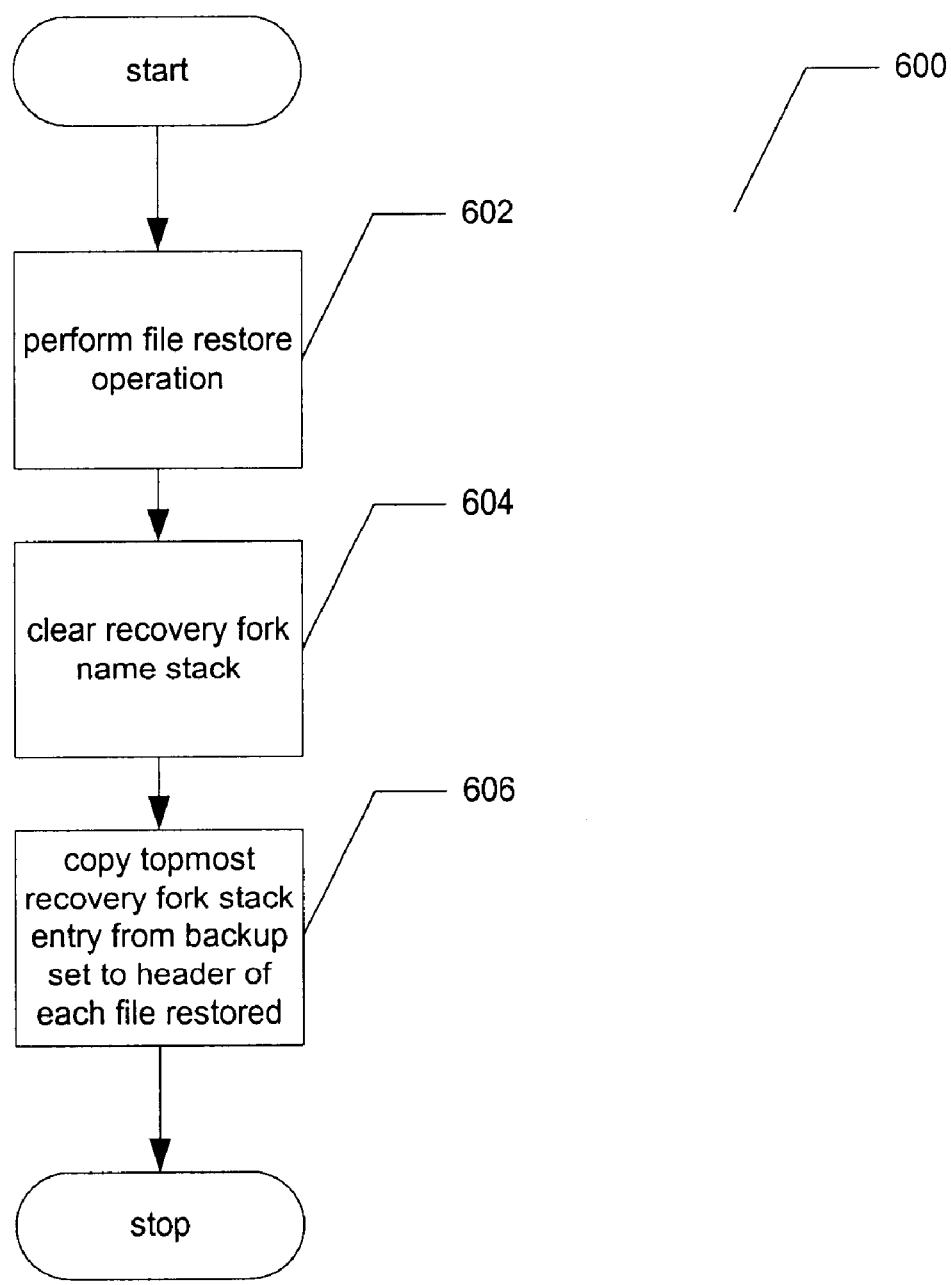
FIG. 6 is a flowchart illustrating still another example method for performing a restore operation, according to still another operational example of an embodiment of the present invention.

File restore operations are always permitted, but cause subsequent restore operations to be handled differently, as discussed below in connection with log restore operations. FIG. 6 depicts an example method 600 for performing a file restore operation. First, at a block 602, the file restore operation is performed.

After the file restore operation is completed, recovery fork maintenance is performed as follows. At a block 604, the recovery fork stack is cleared. Next, at a block 606, for each file restored, the topmost recovery fork stack entry from the backup set is copied to each file's header.

Figure 7:
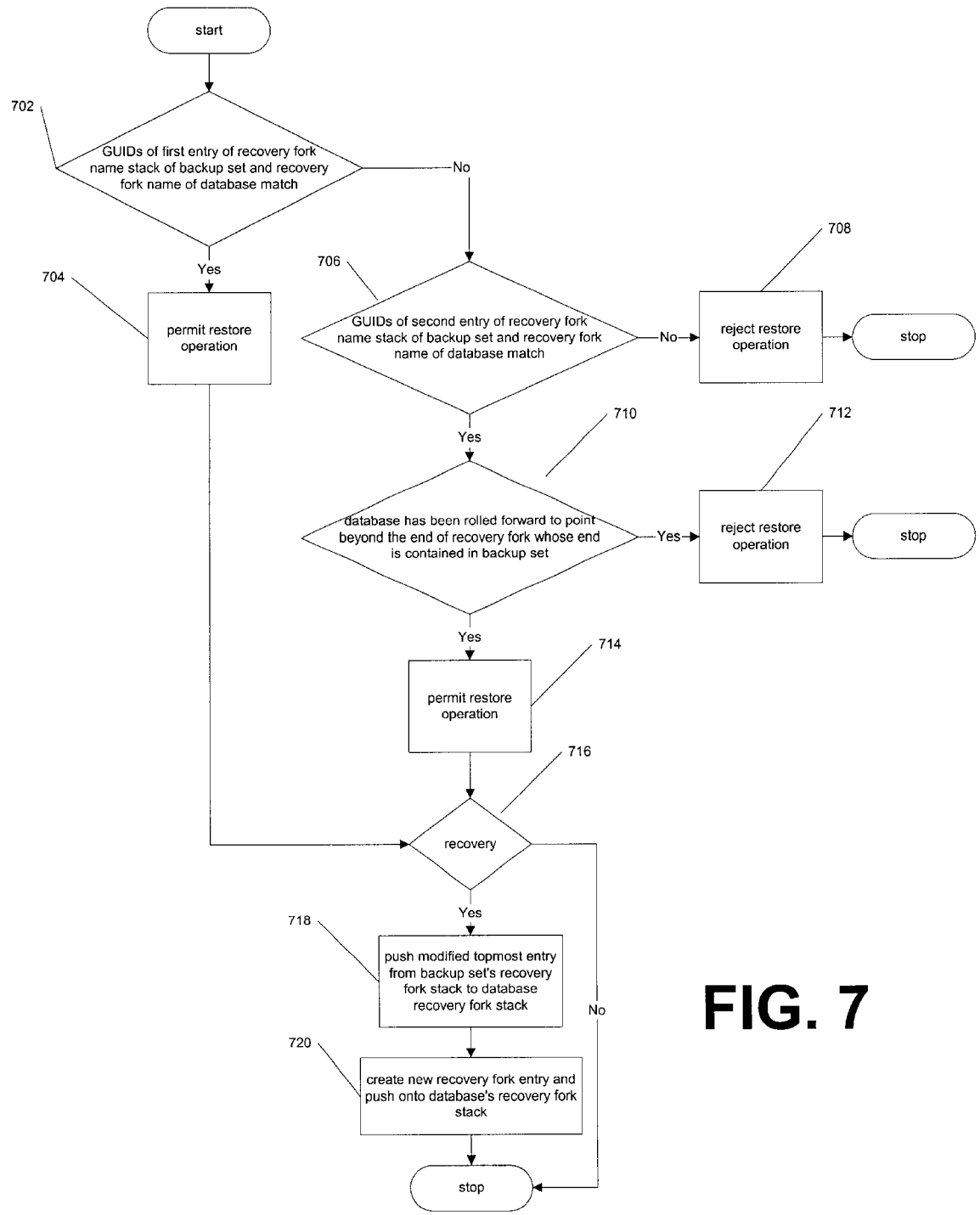
FIG. 7 is a flowchart illustrating yet another example method for performing a restore operation, according to yet another operational example of an embodiment of the present invention.

Log Restore Operations Following Database or Differential Database Restore Operations As noted above, the way in which a log restore operation is handled depends on whether it follows a database or differential database restore operation on the one hand, or a file restore operation on the other hand. FIG. 7 illustrates an example method 700 for performing a log restore operation, with the option of recovery, that follows a database or a differential database restore operation.

Before the attempted operation is performed, the system determines whether the backup set resides on a recovery fork that is compatible with the fork on which the database resides. Specifically, at a decision block 702, the system determines whether the GUID of the first entry of the recovery fork name stack of the backup set matches the GUID of the recovery fork name of the database. If these GUIDs match, the backup set and the database reside on the same recovery fork, and the attempted restore operation is permitted at a block 704.

If these GUIDs do not match, the system then compares the GUID of the second entry of the recovery fork name stack of the backup set with the GUID of the recovery fork name of the database, as shown at a decision block 706. If those GUIDs do not match, the attempted restore operation is rejected at a block 708. If they do match, the system then checks the LSN of the recovery fork name of the database at a decision block 710 to determine whether the database has been rolled forward to a point beyond the end of the recovery fork whose end is contained in the backup set. If so, the attempted restore operation is rejected at a block 712. Otherwise, the operation is permitted at a block 714.

Assuming the attempted log restore operation was permitted, recovery fork maintenance is performed after the operation is completed if the log restore operation is performed with the option of recovery, as determined at a decision block 716. At a block 718, the topmost entry from the recovery fork name stack of the backup set is pushed onto the database recovery fork name stack, with its LSN replaced with the last LSN of the backup set. Next, at a block 720, a new recovery fork entry is created and is pushed onto the database recovery fork name stack. This new recovery fork entry has a new GUID and an LSN corresponding to the last LSN of the backup set.

Log Restore Operation Following One or More File Restore Operations

Figure 8A:
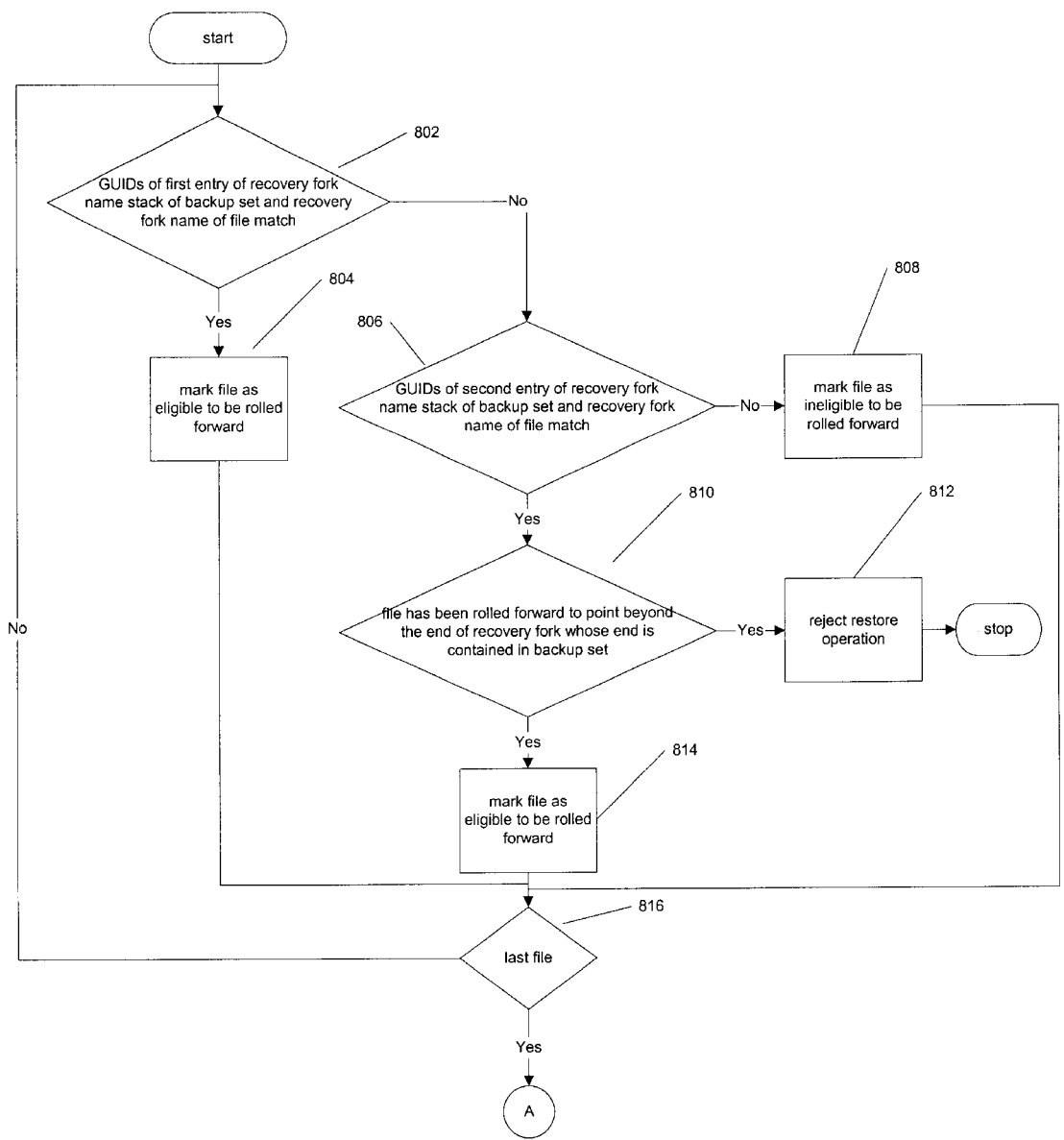
FIGS. 8A and 8B form a flowchart illustrating another example method for performing a restore operation, according to another operational example of an embodiment of the present invention.
Figure 8B:
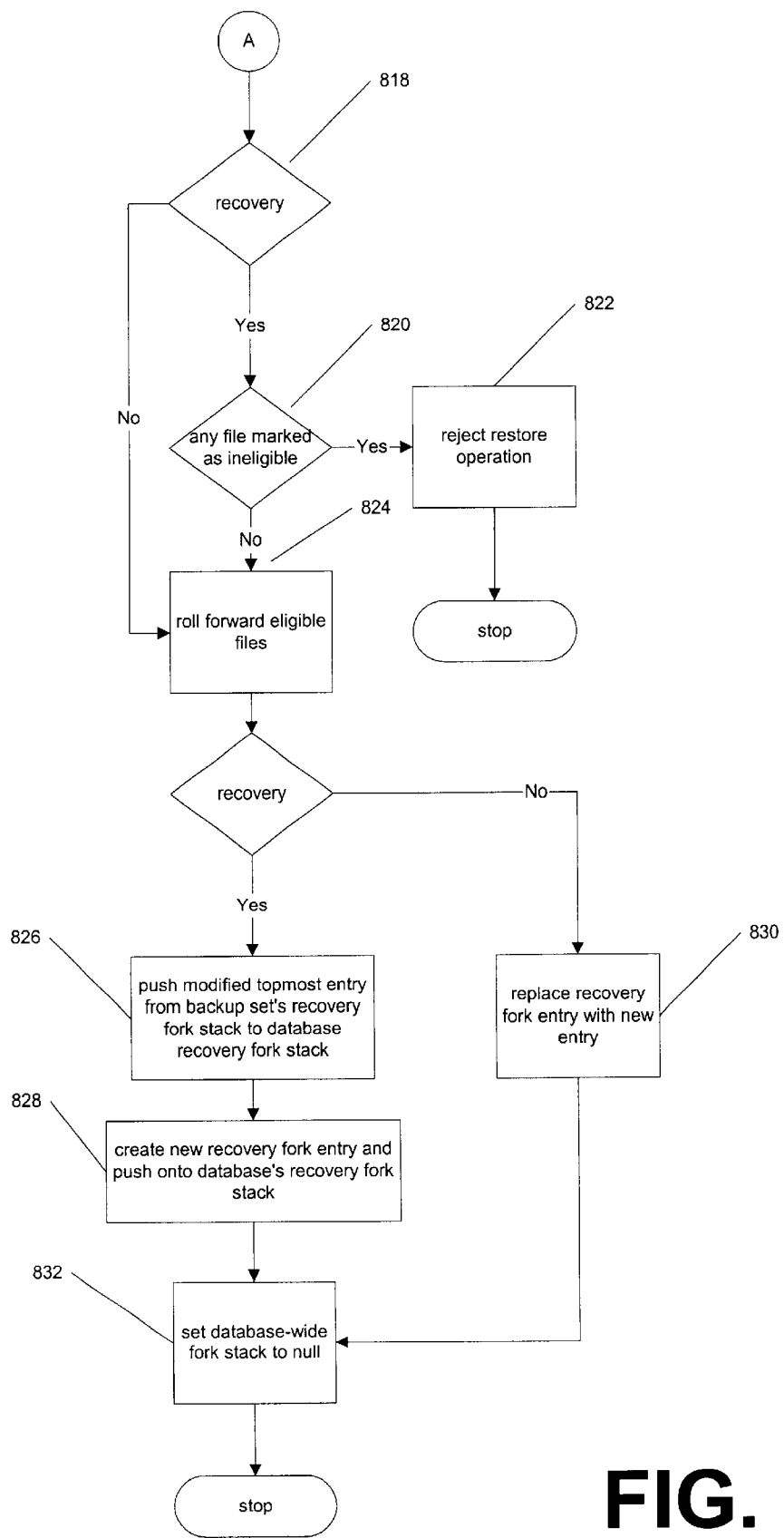

FIGS. 8A and 8B depicts an example method 800 of performing a log restore operation that follows one or more file restore operations. FIGS. 8A and 8B are connected by the connectors labeled "A" at the bottom of FIG. 8A and at the top of FIG. 8B. Fork validation proceeds somewhat similarly to the case in which the log restore operation follows a database or differential database restore operation, with some differences.

One difference is that fork validation is performed with respect to each database file. For each database file, at a decision block 802, the system determines whether the GUID of the first entry of the recovery fork name stack of the backup set matches the GUID of the recovery fork name of the file. If these GUIDs match, the backup set and the file reside on the same recovery fork, and the file is marked as eligible to be rolled forward at a block 804.

If these GUIDs do not match, the system then compares the GUID of the second entry of the recovery fork name stack of the backup set with the GUID of the recovery fork name of the file, as shown at a decision block 806. If those GUIDs do not match, the file is marked as ineligible to be rolled forward at a block 808. If they do match, the system then checks the LSN of the recovery fork name of the file at a decision block 810 to determine whether the file has been rolled forward to a point beyond the end of the recovery fork whose end is contained in the backup set. If so, the entire restore operation attempt is rejected at a block 812. Otherwise, the file is marked as eligible to be rolled forward at a block 814. At a decision block 816, the system determines whether any files remain to be processed. If so, execution returns to block 802 and evaluates the next file.

After all files have been processed in this manner, flow proceeds to a decision block 818 of FIG. 8B, at which it is determined whether the attempted restore operation is to be performed with or without the option of recovery. If the operation is to be performed with the option of recovery, then, at a decision block 820, it is determined whether any file was marked as ineligible. If so, the entire attempted restore operation is rejected at a block 822. If, on the other hand, the operation is to be performed without the option of recovery, the restore operation proceeds unless it was rejected in connection with block 812. As shown in block 824, the files that were marked as eligible to be rolled forward in connection with block 814 are rolled forward. Any files that were marked as ineligible to be rolled forward in connection with block 808 are not rolled forward, but the restore operation still proceeds with respect to those files that were marked eligible.

After the restore operation has been completed, fork maintenance is performed. In the case of a restore operation performed with the option of recovery, at a block 826, a new recovery fork entry is pushed onto each eligible file's recovery fork name stack. This entry has the GUID from the topmost recovery fork entry in the backup set's recovery fork name stack and the ending LSN from the backup set. Next, at a block 828, a new recovery fork entry is created and is pushed onto the database's recovery fork name stack. This entry has a new GUID and the ending LSN from the backup set. In the case of a restore operation performed without the option of recovery, at a block 830, the recovery fork entry is replaced with a new entry having the GUID from the topmost recovery fork entry in the backup set's recovery fork name stack and the ending LSN from the backup set. Finally, at a block 832, a database-wide fork stack is set to a null value.

Conclusion

While the embodiments of the invention have been described with specific focus on their embodiment in a software implementation, the invention as described above is not limited to software embodiments. For example, the invention may be implemented in whole or in part in hardware, firmware, software, or any combination thereof. The software of the invention may be embodied in various forms, such as a computer program encoded in a machine-readable medium, such as a CD-ROM, magnetic medium, ROM or RAM, or in an electronic signal. Further, as used in the claims herein, the term "module" shall mean any hardware or software component, or any combination thereof.

what is claimed is:

1. A computer-implemented method for restoring information to an electronic database from a sequence of at least one backup set, the method comprising:

maintaining a history of one or more backup operations performed on the electronic database, the history associated with a recovery fork;

intercepting an attempted restore operation that uses the backup set;

determining whether the backup set is associated with the recovery fork or a descendant of the recovery fork;

permitting the backup set to be applied to the electronic database only if the backup set is associated with the recovery fork or a descendant of the recovery fork; and maintaining a history both on the electronic database and the backup set, wherein each history comprises a push-down stack of a plurality of recovery fork names.

2. The method of claim 1, wherein each push-down stack comprises two recovery fork names.

3. The method of claim 1, further comprising:

comparing a recovery fork name associated with the electronic database with the recovery fork names in the push-down stack associated with the backup set; and permitting the backup set to be applied to the electronic database only if the recovery fork name associated with the backup set is compatible with one of the recovery fork names in the pushdown stack associated with the electronic database.

4. The method of claim 1, wherein each of the recovery fork names in each push-down stack comprises a globally unique identifier (GUID) and a log sequence number (LSN).

5. The method of claim 4, further comprising:

determining whether a recovery fork name associated with the backup set has a GUID that matches a GUID of a recovery fork name associated with the electronic database;

permitting the backup set to be applied to the electronic database if the GUID of a topmost entry of the push-down stack associated with the backup set matches the GUID of the recovery fork name associated with the electronic database;

in response to identifying a first recovery fork name, other than the topmost entry of the push-down stack associated with the backup set, associated with the backup set and a second recovery fork name associated with the electronic database that have matching GUIDs, comparing the the LSN of the first recovery fork name with the LSN of the second recovery fork name;

rejecting the attempted restore operation if the LSN of the second recovery fork name is greater than the LSN of the first recovery fork name; and permitting the backup set to be applied to the electronic database if a recovery fork name associated with the backup set has a GUID that matches a GUID of a recovery fork name is no greater than the LSN of the first recovery fork name.

6. The method of claim 1, further comprising:

determining whether the attempted restore operation is to be performed with or without an option for recovery;

if the attempted restore operation is to be performed with the option for recovery, replacing the recovery fork names associated with the electronic database with the recovery fork names associated with the backup set, generating a new recovery fork name;

pushing the new recovery fork name onto the push-down stack associated with the electronic database, the new recovery fork name comprising a GUID and the LSN of the backup set; and if the attempted restore operation is to be performed without the operation for recovery, clearing the push-down stack associated with the electronic database, and pushing a topmost recovery fork name of the push-down stack associated with the backup set onto the push-down stack associated with the electronic database.

7. The method of claim 1, wherein the electronic database comprises a plurality of files each associated with a current recovery fork identifier, wherein the attempted restore operation is a log restore operation occurring subsequent to at least one file restore operation for using a plurality of backup files, and further comprising:

for each of the plurality of backup files, comparing a current recovery fork identifier associated with a file of the electronic database with a plurality of recovery fork identifiers associated with the backup file, marking the file of the electronic database as eligible to be applied to the electronic database if a most recent one of the recovery fork identifiers associated with the backup file has the same globally unique identifier (GUID) as the current recovery fork identifier associated with the file of the electronic database, or if another one of the recovery fork identifiers associated with the backup file has a same GUID as the current recovery fork identifier associated with the file of the electronic database and has a log sequence number (LSN) greater than or equal to an LSN of the current recovery fork identifier associated with the file of the electronic database;

applying to the electronic database only the backup files marked as eligible;

coping the most recent one of the recovery fork identifiers associated with the backup file to a file header associated with the file of the electronic database; and setting a database-wide fork stack to a null value.

8. A computer-implemented method for restoring information to an electronic database from a backup set, the method comprising:

maintaining in the electronic database and in the backup set a history of one or more backup operations performed on the electronic database, the electronic database associated with a recovery fork, each history comprising a push-down stack of two recovery fork names each having a globally unique identifier (GUID) and a log sequence number (LSN);

intercepting an attempted restore operation that uses the backup set;

determining whether a recovery fork name associated with the backup set has a GUID that matches a GUID of a recovery fork name associated with the electronic database;

in response to identifying a first recovery fork name associated with the backup set and a second recovery fork name associated with the electronic database that have matching GUIDs, comparing the LSN of the first recovery fork name with the LSN of the second recovery fork name;

rejecting the attempted restore operation if the LSN of the second recovery fork name is greater than the LSN of the first recovery fork name; and permitting the attempted restore operation if a recovery fork name associated with the backup set has a GUID that matches a GUID of a recovery fork name associated with the electronic database and the LSN of the second recovery fork name is no greater than the LSN of the first recovery fork name.

9. A computer-implemented method for creating a backup set based on information from an electronic database, the method comprising:

maintaining a history of one or more backup operations performed on the electronic database, wherein said history comprises a push-down stack of a plurality of recovery fork names;

copying the history to the backup set;

if the backup set is to be the result of a database backup operation, updating the history to reflect a binding identifier of the backup set;

if the backup set is to be the result of a backup operation other than a file backup operation, updating the history; and performing a backup operation.

10. The method of claim 9, wherein each of said recovery fork name has a globally unique identifier (GUID) and a log sequence number (LSN), further comprising:

if the backup set is to be the result of a database backup operation,
updating the LSN of a topmost recovery fork name of the push-down stack to reflect a synchronization point of the backup set, and
copying the updated push-down stack to the backup set; and if the backup set is to be the result of a backup operation other than a file backup operation, setting the LSN of the topmost recovery fork name of the push-down stack to a current end-of-log LSN.

11. A computer-readable medium having computer-executable modules comprising:

a maintenance module configured to maintain a history of one or more backup operations performed on the electronic database, the electronic database associated with a recovery fork, wherein said history comprises a push-down stack of a plurality of recovery fork names;

an interceptor module configured to intercept an attempted restore operation that uses the backup set; and a control module configured to determine whether the backup set is associated with the recovery fork or an descendant of the recovery fork, and to permit the backup set to be applied to the electronic database only if the backup set is associated with the recovery fork or an descendant of the recovery fork.

12. The computer-readable medium of claim 11, wherein the maintenance module is further configured to maintain a history both on the electronic database and on the backup set, each history being maintained as a push-down stack of a plurality of recovery fork names.

13. The computer-readable medium of claim 12, wherein each of the recovery fork names in each push-down stack comprises a globally unique identifier (GUID) and a log sequence number (LSN).

14. The computer-readable medium of claim 13, wherein the control module is further configured to:

determine whether a recovery fork name associated with the backup set has a GUID that matches a GUID of a recovery fork name associated with the electronic database;

permit the backup set to be applied to the electronic database if the GUID of a topmost entry of the push-down stack associated with the backup set matches the GUID of the recovery fork name associated with the electronic database;

in response to identifying a first recovery fork name, other than the topmost entry of the push-down stack associated with the backup set, associated with the backup set and a second recovery fork name associated with the electronic database that have matching GUIDs, compare the LSN of the first recovery fork name with the LSN of the second recovery fork name;

reject the attempted restore operation if the LSN of the second recovery fork name is greater than the LSN of the first recovery fork name; and permit the backup set to be applied to the electronic database if a recovery fork name associated with the backup set has a GUID that matches a GUID of a recovery fork name associated with the electronic database and the LSN of the second recovery fork name is no greater than the LSN of the first recovery fork name.

15. The computer-readable medium of claim 12, wherein the control module is further configured to:

comparing a recovery fork name associated with the electronic database with the recovery fork names in the push-down stack associated with the backup set; and permit the backup set to be applied to the electronic database only if the recovery fork name associated with the backup set is compatible with one of the recovery fork names in the push-down stack associated with the electronic database.

16. The computer readable medium of claim 12, wherein the maintenance module is further configured to:

determine whether the attempted restore operation is to be performed with or without an option for recovery;

if the attempted restore operation is to be performed with the option for recovery,
  replace the recovery fork names associated with the electronic database with the recovery fork names associated with the backup set,
  generate a new recovery fork name,
  push the new recovery fork name onto the push-down stack associated with the electronic database, the new recovery fork name comprising a new GUID and the LSN of the backup set; and
if the attempted restore operation is to be performed without the operation for recovery,
  clear the push-down stack associated with the electronic database, and
  push a topmost recovery fork name of the push-down stack associated with the backup set onto the push-down stack associated with the electronic database.

17. The computer-readable medium of claim 12, wherein the electronic database comprises a plurality of files each associated with a current recovery fork identifier, wherein the attempted restore operation is a log restore operation occurring subsequent to at least one file restore operation, and wherein:
  the control module is further configured to
    determine whether the push-down stack associated with the electronic database is empty, and
    if the push-down stack associated with the electronic database is empty, permit the attempted restore operation if the current recovery fork identifiers of the plurality of files are compatible; and
  the maintenance module is further configured to
    if the push-down stack associated with the electronic database is empty, push the current recovery fork identifier from one of the plurality of files onto the push-down stack associated with the electronic database,
    if the restore operation is performed with the option of recovery, generate a new recovery fork name comprising a GUID and an LSN, and
    push the new recovery fork name onto the push-down stack associated with the electronic database.

18. A computer-readable medium having computer-executable modules comprising:
  a maintenance module configured to maintain in the electronic database and in the backup set a history of one or more backup operations performed on the electronic database, the electronic database associated with a recovery fork, each history comprising a push-down stack of two recovery fork names each having a globally unique identifier (GUID) and a log sequence number (LSN);
  an interceptor module configured to intercept an attempted restore operation that uses the backup set; and
  a control module configured to
    determine whether a recovery fork name associated with the backup set has a GUID that matches a GUID of a recovery fork name associated with the electronic database;
    permit the backup set to be applied to the electronic database if the GUID of a topmost entry of the push-down stack associated with the backup set matches the GUID of a recovery fork name associated with the electronic database;
    in response to identifying a first recovery fork name, other than the topmost entry of the push-down stack associated with the backup set, associated with the backup set and a second recovery fork name associated with the electronic database that have matching GUIDs, compare the LSN of the first recovery fork name with the LSN of the second recovery fork name;
    reject the attempted restore operation if the LSN of the second recovery fork name is greater than the LSN of the first recovery fork name; and
    permit the backup set to be applied to the electronic database if a recovery fork name associated with the backup set has a GUID that matches a GUID of a recovery fork name associated with the electronic database and the LSN of the second recovery fork name is no greater than the LSN of the first recovery fork name.

19. A computer-readable medium having computer-executable modules comprising:
  a maintenance module configured to
    maintain a history of one or more backup operations performed on the electronic database, wherein said history comprises a push-down stack of a plurality of recovery fork names;
    copy the history to the backup set,
    if the backup set is to be the result of a database backup operation, updating the history to reflect a binding identifier of the backup set, and
    if the backup set is to be the result of a backup operation other than a file backup operation, update the history; and
  a backup module configured to perform a backup operation.

20. The computer-readable medium of claim 19, wherein each of said recovery fork names has a globally unique identifier (GUID) and a log sequence number (LSN), and where the maintenance module is further configured to:
  if the backup set is to be the result of a database backup operation, update a differential binding identifier of a database-wide fork stack to reflect a binding identifier of the backup set; and
  if the backup set is to be the result of a backup operation other than a file backup operation, set the LSN of the topmost recovery fork name of the push-down stack to a current end-of-log LSN.

* * * * *